United States Patent [19]

Thakur

[11] 4,015,931
[45] Apr. 5, 1977

[54] BONDED-ABRASIVE WIRE SAW

[75] Inventor: Babu N. Thakur, Schaumburg, Ill.

[73] Assignee: Engelhard Minerals & Chemicals Corporation, Murray Hill, N.J.

[22] Filed: Sept. 29, 1975

[21] Appl. No.: 617,853

[52] U.S. Cl. ................................................ 125/21
[51] Int. Cl.² .......................................... B28D 1/08
[58] Field of Search ....................... 125/12, 18, 21

[56] References Cited
UNITED STATES PATENTS

| | | | |
|---|---|---|---|
| 2,156,652 | 5/1939 | Harris | 125/21 UX |
| 2,773,495 | 12/1956 | LeFevre | 125/21 |
| 3,847,569 | 11/1974 | Snow | 125/21 |

*Primary Examiner*—Harold D. Whitehead

[57] ABSTRACT

This improved wire saw for sawing various materials, including, for example, granite, marble, limestone and the like comprises in combination an elongated abrasive carrier of novel design and bonded abrasives secured thereto. The carrier comprises a plurality of discrete high tensile strength strands, e.g., high-alloy steel strands, longitudinally interlocked in contacting relationship. The strands have complementally nesting cross-sectional configurations which form, in juxtaposed combination, a generally circular transverse cross section having a cross-sectional void space of less than about 20 percent, preferably less than 15 percent. Bonded abrasive particles, preferably super-abrasive particles such as natural or synthetic diamonds or cubic boron nitride particles or mixtures thereof, are fixedly secured to the outer periphery of the elongated multi-membered abrasive carrier, preferably in the form of discrete segments longitudinally disposed therealong.

24 Claims, 11 Drawing Figures

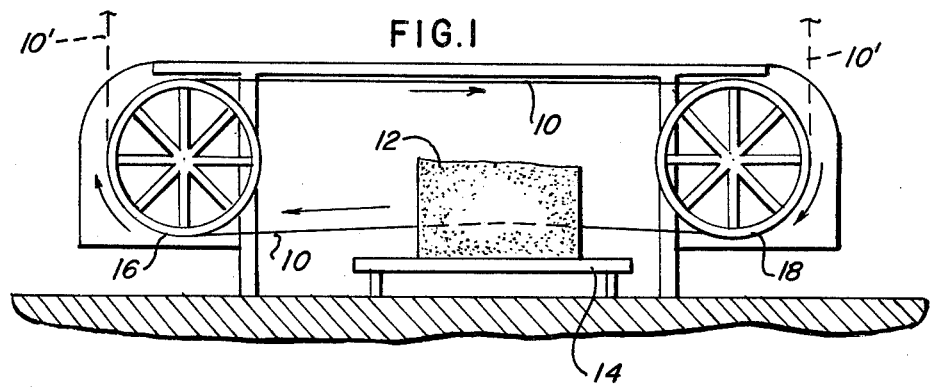
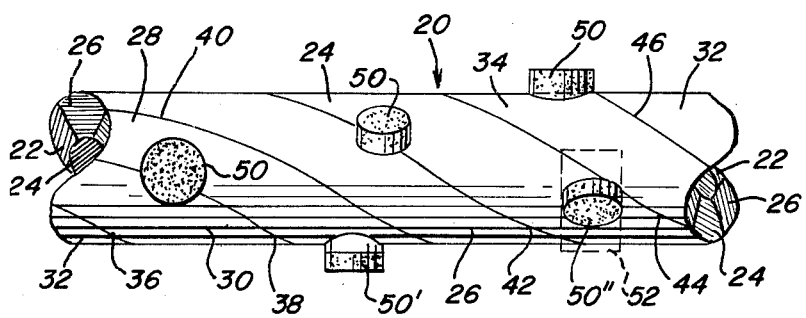
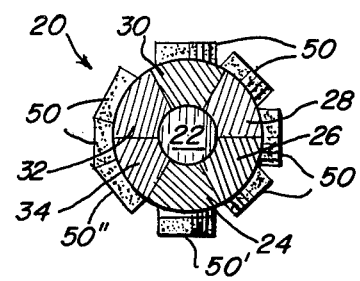
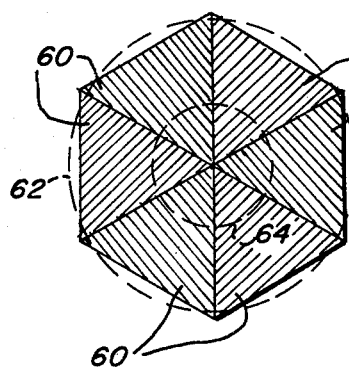
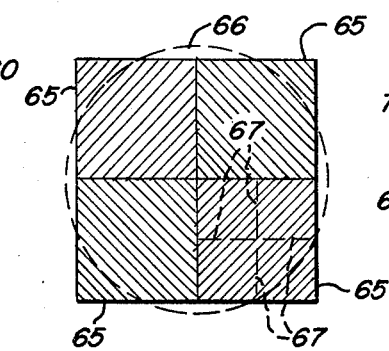
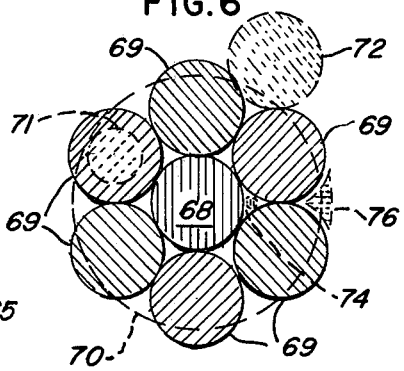
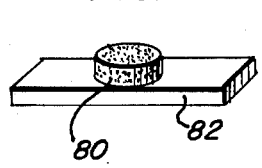
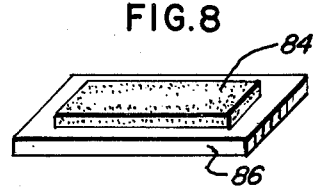
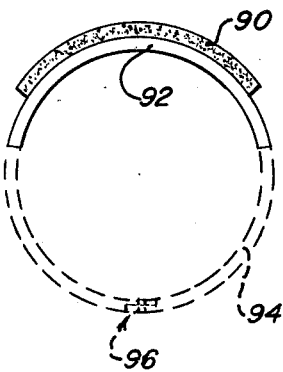
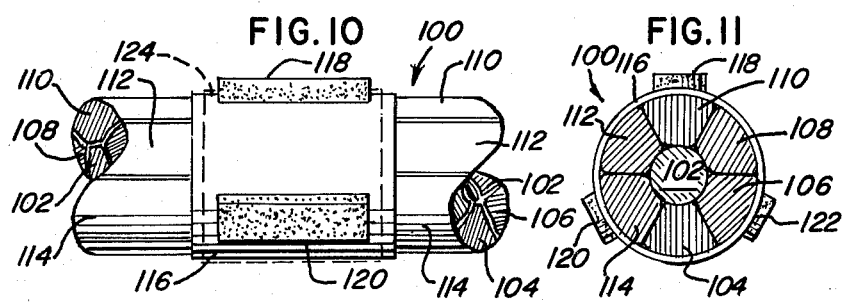

BONDED-ABRASIVE WIRE SAW

BACKGROUND OF THE INVENTION

1. Field of the Invention

This invention relates to an improved wire saw of the type advantageously used in the sawing of various materials, particularly hard materials, e.g., glass, ceramics, refractories, concrete and stone such as blocks of granite, marble, limestone and the like. More specifically, it relates to an improved wire saw employing fixed or bonded abrasives which is characterized by high strength, improved efficiency and enhanced wear characteristics.

While the present invention will be described with particular reference to certain embodiments employing fixed super-abrasive particles, which may be advantageously employed in the sawing of granite, it should be understood that the invention is not necessarily limited thereto. The concept set forth herein can be readily adapted for use in connection with other embodiments and other applications, as those skilled in the art will recognize in the light of the present disclosure.

As used herein, the term "super-abrasive" refers to abrasive media having a hardness on the Knoop scale in excess of about 3000 kg/mm$^2$. Commercially-available super-abrasives include natural and synthetic industrial diamonds and cubic boron nitride, although the present invention is not necessarily limited thereto. These contrast with conventional abrasives which have a hardness substantially less than about 3000 kg/mm$^2$, e.g., garnet, tungsten carbide, silicon carbide, emery, aluminum oxide and the like. A comparison of Knoop and Mohs hardness values for conversion purposes is available in standard handbooks.

2. Description of the Prior Art

As those skilled in the art of stonecutting are well aware, there are many types of wire saws available for sawing blocks of granite, marble, limestone and the like into slabs or other desired geometric configurations. These prior-art saws include, for example, stranded wires, twisted metal strips, and the like which are used in conjunction with abrasive slurries to achieve the desired cutting action. Illustrative patents featuring such saws include, for example, U.S. Pat. Nos. 1,730,756, 2,003,994, 2,123,619, 2,451,383, 2,604,883, 2,718,222, 2,876,761 and 3,532,083.

While certain of such saws are used extensively, they suffer from one or more limitations. They may, for example, have limited tensile strength which prevents the use of the higher tensile forces required to produce faster, more efficient cuts. Because super-abrasives are so costly and the loss rates of abrasives when used in the form of slurries is so high, such slurry techniques are largely limited to conventional abrasives with their inherently limited sawing characteristics. Moreover, the usable life of such saws is extremely limited, particularly when sawing the harder stones such as granite. To achieve extended sawing cycles, they must be used in excessively long lengths, sometimes substantially exceeding a thousand feet or more in total loop length. Because the abrasives are used in slurry form, handling and ecological problems result which limit and/or increase the cost of using the same.

Alternative designs include stranded wires which provide the carrier or substrate for bonded abrasives, illustrative prior art including, for example, U.S. Pat. Nos. 640,139, 1,306,636 and 3,150,470. While these wire saws avoid the problems associated with abrasive slurries, the design thereof also precludes maximum tensile sawing forces because of the substantial proportion of interstitial void spaces in the wire cross section. Increasing the overall diameter of the stranded wire to compensate for the presence of undesired void spaces is counter-productive because the width of the resulting kerf is correspondingly increased. Thus, the higher tensile sawing forces are largely offset by the increased amount of stone which has to be sawn. This also represents a loss of materials and an increase in the amount of swarf which has to be removed and disposed of.

Attempts have also been made to use a single solid wire carried or substrate for the abrasive and thereby maximize the cross-sectional area carrying the tensile forces within the constraint of a given diameter. Illustrative prior art includes, for example, U.S. Pat. Nos. 2,633,681 and 3,886,926. While representing an advantageous alternative in some respects, such single wire designs suffer from the fact that the large diameter or maximum diametral dimension of the single wire results in high bending stresses therein as the carrier passes around the various drive and guide sheaves during the sawing operation. Since the total stress to which a wire may be subjected before rupture or fatigue failure is a substantially additive function of bending stresses, tensile sawing stresses and other miscellaneous stresses, the large bending stresses associated with the large diameter of a single strand severely limit the useful tensile sawing stresses or forces which may be applied. In short, the single strand alternative suffers from a relatively high and unfavorable ratio of unavoidable bending stresses to maximum permissible tensile sawing stresses. The end result is limited sawing rates and shortened saw life and attendant inefficiency and high cost.

Moreover, in certain single solid wire designs, the advantage of maximized cross-sectional areas may be further offset in part by a departure from a generally circular cross section and the presence of load-robbing grooves or slots therein. Since the bending stresses are essentially determined by the largest diametral dimension, the loss in cross-sectional area due to the presence of slots or the like is not accompanied by a corresponding decrease in bending stresses, which continue to unduly limit the tensile sawing forces which can be applied. The inherent lack of flexibility in a single strand also makes it difficult to handle, store or process, particularly in extended lengths.

OBJECTS OF THE INVENTION

It is therefore a general object of the present invention to cope with the aforementioned and related prior art problems. It is another general object to provide a wire saw design which incorporates the advantageous features of various prior art designs without the attendant disadvantages.

It is still another general object to provide an improved wire saw capable of enhanced cutting rates, long life and lower overall sawing costs. It is still another general object to provide a wire saw which employs bonded abrasives and does away with the requirement for abrasive slurries and associated handling and ecological problems. It is a further general object to provide an improved design for a wire saw which lends itself to the use of bonded super-abrasives and can be efficiently employed in the sawing of the harder rocks such as granite without requiring long saw lengths or larger cross-sectional diameters.

It is a specific object to provide a wire saw design which may be used with conventional size sawing machines without encountering high bending stresses which limit the tensile sawing forces which may be applied. It is another specific object to provide a wire saw design having a large, effective stress-carrying cross-sectional area within a limited diameter or diametral dimension. It is another specific object to provide a wire saw which does not suffer from the disability of high bending stresses and fatigue-failure problems associated with prior art single strand carriers.

It is another specific object to provide a long-wearing, multi-membered wire saw having the large stress-carrying capabilities normally associated with a single solid strand without the attendant load-robbing excessive bending stresses associated therewith. It is another specific object to provide a wire saw having a decreased ratio of unavoidable bending stresses to maximum permissible tensile sawing stresses. It is another specific object to provide a small diameter wire saw having the flexibility and handling ease of a multi-stranded construction without the load-robbing interstitial void spaces normally associated therewith.

These and other objects will become apparent to those skilled in the art as the detailed description proceeds.

SUMMARY OF THE INVENTION

These objects are achieved by an improved wire saw construction featuring a bonded abrasive carrier characterized by being multi-membered, generally circular and substantially compacted or densified in transverse cross section. In brief, the wire saw comprises an elongated abrasive carrier of novel design, as hereinafter described, and bonded abrasive particles longitudinally disposed therealong whereby to abrade a workpiece when the wire saw is brought into abrading contact therewith.

The elongated abrasive carrier comprises a plurality of discrete high tensile strength strands arranged, interlocked or nested in contacting relationship. The strands preferably comprise high alloy steel of high tensile strength and ductility and have cross-sectional configurations which in combination form a generally circular transverse cross section. The term "generally circular" is intended to connote that the maximum cross-sectional dimension is no more than about 20 percent greater than the minimum, and preferably less, a circle being the optimal embodiment.

To assure that bending stresses are minimized, the largest cross-sectional dimension of any strand or member making up the abrasive carrier should be no more than about one-half the largest cross-sectional dimension of said abrasive carrier, and preferably substantially less. In a preferred embodiment, the largest dimension of the strands is no more than about one-third the largest dimension of the carrier.

The strands of the carrier are compacted or densified whereby to minimize any cross-sectional interstitial void space. As compared with a typical stranded configuration having a cross-sectional interstitial void space in excess of about 20 percent, the structure of the present invention features an interstitial void space of less than 20 percent, preferably 15 percent or less, optimally 10 percent or less. A void space of at least about 1 percent, however, is usually desirable to assure that the strands are not unduly cold welded together or otherwise connected by friction or otherwise, whereby substantial stresses might be peripherally transmitted from strand or member to another contacting strand or member.

As used herein, interstitial void space or, simply, void space connotes the difference between the cross-sectional area of the material itself and the area of the smallest circle which would encompass the entire cross-sectional configuration of the abrasive carrier, excluding the bonded abrasive particles. The percentage figures used in this connection are based upon the area of said smallest circle.

The compaction of the individual strands to minimize the cross-sectional interstitial void space may be achieved by initially configuring the cross section of the individual strands so that they complementally nest with each other into a substantially-void-free circular configuration when assembled in juxtaposed combination. Alternatively, non-nesting configurations having the desired total cross-sectional area exclusive of the void space may be assembled and thereafter mechanically deformed so as to achieve the desired compacted generally circular cross-sectional area of minimized void space.

The mechanical deformation may be carried out by grinding, cold rolling, form rolling, or extruding the assembly into the desired configuration. Other techniques known to those skilled in the art of mechanical deformation may also be employed in the light of the present disclosure.

The abrasive carrier may be held in its compacted configuration, even under the stresses of a granite sawing operation, by the presence of a permanent twist or helical set. The twist may be advantageously imparted to the individual strands during the mechanical deformation operation. If the members or strands of the abrasive carrier are longitudinally orientated, rather than helically disposed, the compacted orientation may be maintained in interlocked or nested relationship by bands, rings or sleeves, typically in spaced relationship, but not necessarily so. In another embodiment the strands may be both twisted and banded with sleeves.

The multi-membered abrasive carrier may be assembled, typically in a looped configuration, by assembling the individual strands together and end welding the respective ends together. Alternatively, the abrasive carrier may be fabricated by repeatedly looping a single strand until the desired number of members is achieved and end welding or otherwise securing the two ends. The completed assembly (before or after end welding) may then be mechanically deformed to achieve the densified generally circular configuration desired, optionally imparting at the same time the desired twist, e.g., a twist having a pitch of about 0.02 to 1 foot. In a particular embodiment of the single-stranded repeated loop version, particularly when employing a dozen or more members in the abrasive carrier, the two ends need not be end welded. Only minor loss in stress-carrying capability will result and normally can be tolerated.

Bonded conventional abrasives may be employed with the abrasive carrier of the present invention; but the advantages of the invention are primarily achieved with bonded super-abrasives. These may be obtained from commercial sources, e.g., suppliers of natural or synthetic industrial diamonds or cubic boron nitride. The diamonds are preferably dispersed substantially uniformly in a powdered metal matrix, e.g., a steel-base or copper-base alloy, which binds the super-abrasive particles so as to form a segment, pellet, slug or wafer of desired configuration, e.g., right circular cylinder, cube, or other rectangular solid, or any other suitable geometric configuration.

The abrasive segments may be secured to the abrasive carrier in a random or patterned distribution by conventional means, e.g., adhesives, brazing or the like. In a preferred embodiment, the segments are cemented to the adhesive carrier by epoxy resin adhesives.

The segments may be multi-layered, including, for example, a non-abrasive containing backing member which may conform to the shape of the segment or may extend well beyond the peripheral limits thereof. In this multi-layered embodiment, the non-abrasive containing backing member may be fixedly secured to the elongated abrasive carrier by the aforementioned conventional means.

In a particular embodiment, the backing member may take the form of a collar or sleeve which encircles the abrasive carrier and may also function as a restraining means for holding the multi-membered carrier in compacted, substantially void-free orientation. In such case, the backing member may be secured to the carrier by the aforementioned conventional means or may be locked thereto by mechanical means, e.g., complementary male and female interlock, overlapping edge interlock or the like, or even a combination of such means.

BRIEF DESCRIPTION OF THE DRAWINGS

The present invention will be more clearly understood from the following detailed description of specific embodiments read in conjunction with the accompanying drawings, wherein:

FIG. 1 is a schematic elevation view illustrating the type of wire sawing operation wherein the wire saw of the present invention is advantageously employed;

FIG. 2 is a fragmentary plan view on an enlarged scale of an embodiment of the wire saw of the present invention;

FIG. 3 is an end view of the wire saw of FIG. 2 on the same enlarged scale;

FIGS. 4, 5 and 6 are schematic diagrams illustrating on an enlarged scale how the multi-membered, circular abrasive carrier of the present invention is prepared by densifying or compacting individual strands so as to substantially eliminate any void space, alternative variations being indicated by dashed lines;

FIGS. 7, 8 and 9 illustrate on an enlarged scale several of many embodiments of abrasive segments with optional backing members which may be advantageously employed in the wire saw of the present invention;

FIG. 10 is a fragmentary plan view on an enlarged scale of an embodiment of the wire saw of the present invention wherein anchoring sleeves are employed to hold the discrete strands in compacted relationship, said anchoring sleeves also being the point of attachment for longitudinally-aligned, rectangular abrasive segments, an optional embodiment being indicated thereon in dashed lines; and FIG. 11 is an end view of the wire saw of FIG. 10 on the same enlarged scale.

It should be understood that the drawings are not to scale and that the embodiments are illustrated by simplified graphic symbols, diagrammatic representations and fragmentary views. In certain instances, details which are not necessary for an understanding of the present invention or which render other details difficult to perceive have been omitted. It should be understood, of course, that the invention is not necessarily limited to the particular embodiments illustrated herein.

DETAILED DESCRIPTION OF THE DRAWINGS INCLUDING PREFERRED EMBODIMENTS

In FIG. 1, wire saw 10 is being employed to saw granite block 12 on platform 14 into slabs. Wire saw 10 passes around driven sheave 16, the driving means (not shown) being conventional, and follower sheave 18, both of which are moved downwardly, relative to block 12, as the sawing action proceeds. An aqueous coolant (not shown) is added as the sawing proceeds so as to provide the requisite cooling action and, in addition, to carry away the swarf and other debris from the operation.

As the sawing action proceeds, wire saw 10 gradually rotates about its longitudinal axis, thereby employing the entire abrasive surface thereof in the sawing action. The rotation is induced by slight angular displacement of the sheaves, a practice known to those skilled in the art.

Wire saw 10 may typically have a total length of about 60 feet, although it may be much shorter or longer. While in FIG. 1 it is shown as a continuous loop around sheaves 16 and 18, which typically may have a diameter in the range of about 3 to 8 feet, e.g., 4 to 5 feet, it may also pass over other sheaves (not shown) as suggested by dashed lines 10'. This may extend its total length very considerably, if desired. Unlike prior art designs, which ofen must resort to extreme saw lengths to offset or compensate for excessive wear rates, the super-abrasive embodiments of the present invention are characterized by long-wearing properties and long cycle lengths, even in lengths of 60 feet, or less.

It is the bending action as wire saw 10 passes around sheaves 16 and 18 which produces stresses in wire 10, particularly in the case of smaller diameter sheaves, e.g., 6 feet or less, thereby limiting the tensile forces which may be applied to produce the desired sawing action. In the stranded design of the wire saw of the present invention, the maximum cross-sectional dimension of a member is only a fraction of the total diameter of the abrasive carrier. Since the bending stresses are a function of the maximum cross-sectional or diametral dimension of the individual strands, the small size thereof minimizes such bending stresses and maximizes the strength available to carry the tensile sawing stresses. The compacted orientation of the strands provides a large cross-sectional area for a given overall diameter whereby the tensile sawing forces may be maximized without undue risk of fatigue failure.

In the embodiment of FIGS. 2 and 3 wire saw 20 comprises centrally disposed circular strand 22 which is surrounded peripherally and in contacting relationship by a plurality of strands 24, 26, 28, 30, 32 and 34, each of which has a truncated circular sector cross section. These fit together to form the generally circular overall cross section which is illustrated. In a particular embodiment, the diameter of the carrier is preferably substantially less than 0.5 inch, e.g., about 0.15 to 0.40 inch. After allowing for the height of the bonded abrasive segments, the total diameter is no more than about 0.5 inch and preferably in the range of about 0.2 to 0.4 inch. This assures an acceptably narrow kerf with attendant advantages and avoids excessive swarf.

The various strands 22 through 34 making up the abrasive carrier 20 may be formed and assembled as shown in FIG. 3 or may be mechanically worked into the configuration shown by appropriate mechanical deformation after assembly. The juxtaposed relationship of central strand 22 and peripheral strands 24 through 34 is maintained in part by a permanent twisted conformation which is depicted by longitudinally extending edge seams 36, 38, 40, 42, 44 and 46 in FIG. 2.

Strands 22 through 34 should, as previously indicated, have a high tensile strength and be highly resistant to fatigue. In addition, if substantial metalworking action or grinding of the strands is required to achieve the densified or compacted configuration, such as depicted in FIG. 3, the material of construction should lend itself to such metalworking or grinding operation. For example, if the cross section is achieved by cold working or other metalforming operation, the strand should have sufficient ductility to permit such operation.

While any material meeting the physical requirements of the present invention may be used for the abrasive carrier, the low cost and commercial availability of high strength steels render them particularly advantageous materials for use therein. More specifically, high strength steels having a fatigue limit in excess of about 60,000 p.s.i. and preferably at least about 100,000 p.s.i. are employed. Such steels are well known to those skilled in the art and would include AISI H11, H12 and H13 air hardened tool steels and AISI 4150, 4340, 5140 and 8650 low and medium alloy steels. In a preferred embodiment, an abrasive carrier meeting such strength requirements is fabricated from strands of maraged steel, that is, steel containing 10 to 25 percent nickel and other alloy elements such as cobalt, molybdenum and/or titanium, which is treated to improve strength and ductility by heating and quenching to form martensite, followed by aging for specified times at temperatures similar to those used in tempering.

The bonded abrasive is preferably secured to the abrasive carrier 20 in segmented form such as pellets 50 in FIG. 2. Pellets 50 may comprise super-abrasive particles in a powdered metal matrix, e.g., a copper or steel-based powdered metal matrix. In a particular embodiment, the powdered metal matrix comprises about 85 to 98 percent by weight of copper and about 15 to 2 percent by weight of tin.

Commercial grade copper and tin powders having a suitable particle size distribution to form a firm bond for the abrasive particles may be employed. Preferred embodiments include commercially-available copper and tin powders having particle size distributions predominantly in the range of about 80 to 325 mesh (U.S. Standard Sieve Series), although the invention is not limited thereto and depends in part upon other variables, such as the type and particle size distribution of the abrasive particles. The invention is not, of course, limited to a copper-tin powdered metal bond, as those skilled in the art will recognize in the light of the present disclosure.

In the preferred embodiment the bonded abrasive may comprise any suitable cutting medium having a Knoop hardness in excess of about 3000 kg/mm². As already set forth, super-abrasives meeting these requirements which are commercially available include cubic boron nitride as well as natural or synthetic diamonds. In one commercial version sold by General Electric Company under the trademark BOROZON, cubic boron nitride has a hardness of about 4700 kg/mm². This compares with a hardness of roughly about 7000 kg/mm² for industrial diamonds.

The type, size and concentration of the super-abrasive particles in the powdered metal bond depend in part upon the cost and availability thereof, the equipment to be employed, the rate of feed and the particular material being worked, e.g., granite, marble or the like. There are various other factors, representing trade-offs, which normally have to be taken into consideration and are best determined empirically for a particular operation. In a particular embodiment, diamond powders having a particle size distribution predominantly in the range of about 25 to 100 mesh (U.S. Standard Sieve Series) may be employed.

The concentration of super-abrasives in the bond may range from about 2 to about 50 percent by volume of the total matrix. Thus, for example, the matrix may comprise about 10 percent of super-abrasives and about 90 percent by volume of bond, the latter comprising about 95 percent by weight of copper and about 5 percent by weight of tin. Other bonding ingredients, or ingredients imparting other desired properties, may also be added, as those skilled in the powdered metallurgical arts will readily recognize in the light of this disclosure.

In a particular embodiment, the pelletized superabrasive wafers may be uniform throughout or may include a buffer layer adjacent the abrasive carrier of lesser, the same, or greater thickness. This is suggested in FIG. 2 by pellet 50'. In such embodiment, the buffer layer is normally free of abrasives and may comprise a copper or steel-based powdered metal matrix similar to that used as a bond in the outer abrasive containing layer. Alternatively, it may comprise a solid metal layer of copper, steel or the like and alloys thereof.

In another embodiment, the buffer layer may take the form of a backing member which extends beyond the periphery of the abrasive layer, such as suggested by the strip shown in dashed outline 52 supporting wafer 50" in FIG. 2. Strip 52 may extend partially around the abrasive carrier, as depicted in FIG. 2, or it also may extend entirely around the abrasive carrier and function as a retaining ring or sleeve for the strands of the abrasive carrier. In another embodiment, the underlying buffer strip may extend longitudinally of the axis of the abrasive carrier. Manifestly, the abrasive layer and the backing member may have a variety of geometric configurations to meet particular design requirements and may be secured to the abrasive carrier in a variety of orientations.

When the buffer layer is in the form of a strip, it may comprise an inexpensive commercial grade metal sheet, e.g., 1/32-inch copper sheet. It may also contain other compatible metals so long as the resulting alloy has the requisite physical properties, including strength and the requisite malleability to permit the precise conformation of the backing member to the curvature of the abrasive carrier. The use of a malleable powdered metal bond for the abrasive particles also facilitates the conformation of the bonded abrasive to the curvature of the backing member or abrasive carrier.

The abrasive carrier of FIGS. 2 and 3, which is a composite of a central strand and peripheral truncated circular sector strands, can be assembled from individual strands having the indicated configuration. It may also be fabricated by assembling a central strand and peripheral truncated triangular strands and thereafter mechanically deforming the peripheral strands to the indicated configuration.

Various other ways to arrive at the multi-membered compacted generally circular cross section will be apparent in the light of the present disclosure. A few are illustrated in FIGS. 4 to 6. Others will be suggested by prior art patents in the field of compacted stranded wire, representative patents including, for example, U.S. Pat. Nos. 1,691,921, 1,943,086, 1,943,087, 3,131,469, 3,164,670, 3,234,722, 3,352,098, 3,760,093 and 3,778,993.

Thus, for example, an abrasive carrier may be fabricated by simply assembling the requisite number of circular sectors. If such are not readily available, however, they may be fabricated in place by assembling a series of triangular strands 60, as depicted in FIG. 4, and thereafter mechanically working the assembled structure to produce the desired multi-stranded cross section having minimal void space and maximum area for a given diameter, as indicated by dashed circular outline 62. Instead of reworking the exterior periphery into the desired circular conformation, it may be ground thereto, although this represents a loss of cross-sectional area, as well as metal.

In non-critical applications, the chordal approximation of a circle shown in solid lines in FIG. 4 may prove adequate. In fact, the flattened sides of the hexagon may provide secure mounting sites for the bonded abrasives, particularly if elongated in a longitudinal direction. The advantage of slightly-flattened mounting sites may apply to other embodiments also.

Manifestly, it would be desirable to have a central core, illustrated in FIG. 4 by dashed outline 64, whereby to minimize the largest cross-sectional dimension and thus the bending stresses. The end result would then be a cross-sectional configuration similar to that of FIG. 3.

The desired circular cross section can also be obtained by assembling a plurality of strands having other rectilinear cross sections, as illustrated in FIG. 5. In the embodiment illustrated, the square cross sections 65 are mechanically reworked so as to obtain the desired circular cross section suggested by dashed line 66. The strands may be even smaller in size, as illustrated by dashed lines 67 in FIG. 5, but assembled and reworked into the desired circular conformation.

The use of strands having a circular cross section to produce the abrasive carrier, i.e., a hexagonal close packed configuration, is illustrated in FIG. 6. It comprises central strand 68 and six peripheral strands 69, having a minimum theoretical void space of about 22.2 percent. To achieve the desired minimum void space of the present invention, however, the strands are mechanically reworked so as to approximate a circular cross section illustrated by dashed circle 70. The reworking operation not only provides the outer substantially circular cross section but also reduces the void spaces to an acceptable level, preferably below about 15 percent. The end result of reworking the seven strands is illustrated in FIGS. 10 and 11 to be discussed hereinafter.

While strands 68 and 69 are solid, they may also have a tubular cross section as suggested by dashed circle 71 in FIG. 6. The reworking operation collapses the tubes and results in a substantially solid cross section having a minimum void space.

An outer layer of strands may be added external to strands 69, one strand of an outer layer being suggested by dashed outline 72. They would extend around the entire periphery and would be mechanically reworked to provide the desired generally circular overall cross section and minimum void space. Additional outer layers may also be used, if desired, and similarly reworked.

To minimize or eliminate the need for mechanically reworking the carrier, the interstitial voids may be filled with smaller strands, such as suggested by strand 74 in FIG. 6. It may be circular in cross section or may more closely approximate the geometry of the void so as to register with the adjacent sides of strands 69. Outer void spaces may be similarly filled by the addition of smaller conforming strands such as suggested by approximately-triangular dashed section 76. Little, if any, additional compaction or densification will be required, although some mechanical reworking may still be desired for further minimization of voids or for other reasons, such as banding the strands or the like.

Exemplars of various abrasive segments are illustrated in FIGS. 7, 8 and 9, although the invention is not limited thereto. In FIG. 7, pellet 80 may have the same structure and composition as already described in connection with super-abrasive segments 50 in FIGS. 2 and 3. It may be mounted directly on the abrasive carrier or may be mounted by means of a buffer strip 82 which functions as already described in connection with strip 52 in FIG. 2. Dimensionally, pellet 80 may typically have a diameter of about 0.05 to 0.20 inch and a height of about 0.05 to 0.150 inch.

The abrasive segment 84 in FIG. 8 has a rectilinear or rectangular structure which may be mounted directly on the abrasive carrier or by means of buffer strip or backing member 86. Again, the abrasive layer and backing member may have the structure and composition as already described in connection with FIG. 2.

The abrasive segment may be fabricated with an initial curvature so as to be readily conformable to the abrasive carrier. This is suggested in FIG. 9 wherein super-abrasive segment 90 is elongated and curved so as to wrap around the periphery of the abrasive carrier. If it contains an optional backing member 92, that also would have the desired curvature imparted thereto. As previously indicated, the backing member may extend entirely around the abrasive carrier, as suggested by dashed outline 94, and be mechanically interlocked as suggested by overlapping and pinned section 96, or otherwise fastened, whereby to perform the additional function of acting as a retaining sleeve for the strands of the carrier.

Because it may be desirable to conform the abrasive segments and optional backing members to the curvature of the abrasive carrier, these segments should have the requisite malleability. As above indicated, the compositions already described, i.e., copper-tin bonds for the abrasives and copper or copper alloys for the backing member, have the requisite malleability.

While supporting rings, bands or sleeves are not normally required to hold individual strands in the desired juxtaposed contacting position such as illustrated in FIGS. 2 and 3, they may be used, if desired, particularly if a twist is not imparted to the abrasive carrier. This is illustrated in FIGS. 10 and 11 wherein the abrasive carrier of wire saw 100 comprises central strand 102 and peripheral strands 104, 106, 108, 110, 112 and 114, which are held in place by metal band or sleeve 116. As previously indicated, strands 102 through 114 may originally have been circular, as illustrated in FIG. 6, but have been mechanically reworked to substantially reduce the void space.

Elongated bonded abrasive segments 118, 120 and 122 may be secured to the supporting sleeve 116, as illustrated in FIGS. 10 and 11, or may be secured directly to the strands of the abrasive carrier. Segments 118, 120 and 122 may also be mounted on backing members, a wrap-around backing member for all three segments being suggested by dashed outline 124 in FIG. 10. As previously indicated, sleeve 116 may serve the dual function of both holding the strands in juxtaposed orientation and acting as a backing member for the abrasive segments.

The abrasive segments may, of course, differ in size, configuration and number from those depicted in FIGS. 10 and 11. For example, the abrasive segments may have a broader or narrower width and length and may number from 1 to 10 or more around the periphery of the carrier. As compared with other longitudinal locations along the carrier, they may follow a regular or patterned distribution or may be randomly distributed. Sleeves and abrasive sites such as depicted in FIGS. 10 and 11 may be longitudinally spaced at intervals ranging from substantially zero spacing up to 5 inches or more, e.g., about 0.5 to 2.5 inches.

In a particular embodiment, the wire saw 100 of FIGS. 10 and 11 may be fabricated from a stranded hexagonal close packed configuration, such as is illustrated in FIG. 6, by applying sleeves thereto at spaced longitudinal locations and thereafter mechanically deforming the structure to minimize the void space, whereby the individual strands are compacted, including a flattening of the outer periphery, the generally circular cross section achieved and the sleeves integrated more closely and securely into the structure. The bonded abrasive members may then be secured to the sleeves in alignment with the flattened outer peripheries of the strands. As previously indicated in connection with FIG. 6, small filler strands such as 74 and 76 may be included to minimize the amount of deformation required to achieve the desired compacted, generally-circular cross section, although such filler strands were not used in the embodiment of FIGS. 10 and 11.

Alternatively, the hexagonal close packed configuration of FIGS. 6 may first be mechanically worked to compact it and to achieve a generally circular cross section; and, thereafter, sleeves with or without the segments already secured thereto may be attached. Other variations in fabrication and in the final structure will be readily apparent in the light of this disclosure.

While sleeve 116 in FIGS. 10 and 11 appears to protrude slightly beyond the abrasive carrier for purposes of illustration in FIGS. 10 and 11, it may not do so in practice — at least not to any significant extent. Sleeve 116 may be so thin that it can have substantially the same outer diameter as the abrasive carrier without significantly reducing the diameter of that portion of the abrasive carrier enclosed thereby.

From the above description, it is apparent that the objects of the present invention have been achieved. A wire saw is provided having the effective carrying capacity of a large diameter solid structure without the load-robbing problem of large bending stresses. It has the flexibility and handling ease of a stranded wire without the load-robbing voids associated therewith.

While only certain embodiments have been set forth, alternative embodiments and various modifications of the embodiments depicted will be apparent from the above description to those skilled in the art. These and other alternatives are considered equivalents and within the spirit and the scope of the present invention.

Having described the invention, what is claimed is:

1. A wire saw comprising in combination:
  a. an elongated abrasive carrier comprising a plurality of discrete high tensile strength metal strands having a fatigue limit in excess of about 60,000 p.s.i. longitudinally interlocked in contacting relationship, said strands having complementally nesting cross-sectional configurations forming in juxtaposed combination a generally circular transverse cross section having a cross-sectional void space of less than about 20 percent, the largest cross-sectional dimension of each of said strands being no more than about one half the largest cross-sectional dimension of said abrasive carrier; and
  b. circumferentially-discontinuous discrete segments of bonded abrasive particles fixedly secured adjacent the outer periphery of the elongated abrasive carrier and longitudinally disposed spacedly therealong whereby to abrade a workpiece when said wire saw is brought into abrading contact therewith.

2. The wire saw of claim 1 wherein said elongated abrasive carrier is disposed in the form of a never-ending loop.

3. The wire saw of claim 2 wherein the strands of said elongated abrasive carrier comprise a continuous, single strand repeatedly looped upon itself so as to form a multi-stranded loop.

4. The wire saw of claim 3 wherein the ends of said continuous single strand are secured together.

5. The wire saw of claim 1 wherein said high tensile strength strands comprise strands of maraged steel.

6. The wire saw of claim 1 wherein said strands are longitudinally interlocked by the presence of a permanent longitudinal twist therein.

7. The wire saw of claim 6 wherein the pitch of the twist in said strands is in the range of about 0.02 to 1.0 foot.

8. The wire saw of claim 1 wherein said strands are longitudinally interlocked by sleeves around said abrasive carrier at spaced intervals.

9. The wire saw of claim 8 wherein said bonded particles are secured to said sleeves.

10. The wire saw of claim 1 wherein said wire saw has an outer diameter including bonded abrasive particles of not more than about 0.5 inch.

11. The wire saw of claim 1 wherein said wire saw has an outer diameter including bonded abrasive particles in the range of about 0.2 to 0.4 inch.

12. The wire saw of claim 1 wherein said plurality of discrete high tensile strength strands comprises a centrally-disposed, substantially circular strand surrounded peripherally and in contacting relationship by a plurality of strands each having a generally truncated circular sector cross section.

13. The wire saw of claim 1 wherein said bonded particles are bonded in a powdered metal matrix.

14. The wire saw of claim 13 wherein said powdered metal matrix comprises a powdered copper-tin alloy matrix.

15. The wire saw of claim 1 wherein said bonded abrasive particles are bonded super-abrasive particles having a Knoop hardness in excess of about 3000 kg/mm$^2$.

16. The wire saw of claim 1 wherein said bonded super-abrasive particles are selected from the group consisting of diamonds, cubic boron nitride and mixtures thereof.

17. The wire saw of claim 1 wherein said segments are randomly distributed on said elongated abrasive carrier.

18. The wire saw of claim 1 wherein said segments are distributed on said elongated abrasive carrier in a patterned distribution.

19. The wire saw of claim 18 wherein said segments include an inner, non-abrasive-containing backing member which is fixedly secured to said elongated abrasive carrier.

20. The wire saw of claim 1 wherein said cross-sectional void space is less than about 15 percent.

21. A wire saw comprising in combination:
  a. an elongated abrasive carrier in the form of a closed loop, said carrier comprising a plurality of discrete strands of high tensile strength steel having a fatigue limit of at least about 100,000 p.s.i., the strands being longitudinally interlocked into contacting relationship and having complementally nesting cross-sectional configurations forming in juxtaposed combination a generally circular transverse cross section having a cross-sectional void space of less than about 15 percent, the largest cross-sectional dimension of each of said strands being no more than about one half the largest cross-sectional dimension of said abrasive carrier; and
  b. circumferentially-discontinuous discrete segments of super-abrasive particles having a Knoop hardness in excess of about 3000 kg/mm$^2$ bonded in a powdered metal matrix and fixedly secured at spaced intervals adjacent the outer surface of the elongated abrasive carrier and longitudinally disposed therealong whereby to abrade a workpiece when said wire saw is brought into abrading contact therewith.

22. The wire saw of claim 21 wherein said strands are twisted whereby to longitudinally interlock the same into contacting relationship.

23. The wire saw of claim 21 wherein said strands are interlocked into contacting relationship by sleeves around said strands at spaced intervals.

24. The wire saw of claim 21 wherein said super-abrasive particles are selected from the group consisting of diamonds, cubic boron nitride and mixtures thereof.

* * * * *

UNITED STATES PATENT AND TRADEMARK OFFICE
CERTIFICATE OF CORRECTION

PATENT NO. : 4,015,931
DATED : April 5, 1977
INVENTOR(S) : Babu N. Thakur

It is certified that error appears in the above-identified patent and that said Letters Patent are hereby corrected as shown below:

Column 2, line 14, change the word "carried" to read --carrier--.

Column 8, line 23, after "10%", insert the words --by volume--.

Column 13, line 15, change "18" to --1--.

Signed and Sealed this twelfth Day of July 1977

[SEAL]

Attest:

RUTH C. MASON
*Attesting Officer*

C. MARSHALL DANN
*Commissioner of Patents and Trademarks*